United States Patent [19]

Green et al.

[11] Patent Number: 4,518,506

[45] Date of Patent: May 21, 1985

[54] METHOD FOR TREATING THE UPPER LAYER OF A BODY OF WATER

[76] Inventors: Arthur A. Green, 30 Oak St., Stamford, Conn. 06905; Robert H. Black, 63 Linwood Rd., New Rochelle, N.Y. 10804

[21] Appl. No.: 454,969

[22] Filed: Jan. 3, 1983

[51] Int. Cl.$^3$ .................................................. C02F 1/68
[52] U.S. Cl. ..................................... 210/747; 210/749; 210/764
[58] Field of Search ............... 210/668, 680, 691, 747, 210/749, 764, 924, 925

[56] References Cited

U.S. PATENT DOCUMENTS

| | | | |
|---|---|---|---|
| 1,915,874 | 6/1933 | Sweeney | 210/668 |
| 2,367,384 | 1/1945 | Tymstra et al. | 210/680 |
| 2,595,290 | 5/1952 | Quinn | 210/668 |
| 3,817,739 | 6/1974 | Abbott et al. | 71/67 |
| 3,843,306 | 10/1974 | Whittington et al. | 210/680 |
| 4,142,969 | 3/1979 | Funk et al. | 210/502 |

*Primary Examiner*—Ivars Cintins
*Attorney, Agent, or Firm*—Hopgood, Calimafde, Kalil, Blaustein & Judlowe

[57] ABSTRACT

There is disclosed, in one aspect, a method for treating the upper layer of a body of water to effect a chemical and/or physical change within this upper layer. This method comprises placing a composition comprising an expanded silicate aggregate, such as a boron-containing silicate aggregate, which is impregnated with at least one treating agent such as a herbicide, onto the surface of a body of water, such as a lake, and allowing the composition to float upon the surface for a sufficient period of time to effect the chemical and/or physical change. In another aspect, there is disclosed a composition useful for treating the upper layer of a body of water to effect a chemical and/or physical change. This composition comprises a mixture of the expanded silicate aggregate and at least one treating agent which, when applied in the appropriate concentration and for the appropriate time period, will effect the desired chemical change within the upper layer of the body of water. Certain of these compositions results in changes in the pH of the water and the control of various plant or other growth within the water. Another composition is useful in the cleaning of oil spills.

9 Claims, No Drawings

METHOD FOR TREATING THE UPPER LAYER OF A BODY OF WATER

BACKGROUND OF THE INVENTION

This invention relates to a method for treating the upper layer of contained bodies of water and a composition useful in that method.

Large bodies of water must be treated in order to control, for example, the growth of fungi, algae, and water weeds. These large bodies of water present obstacles to effective chemical treatment using presently known methods, however. A large surface area must be covered and an application of sufficient strength, or concentration, must be obtained.

The present methods of applying chemical agents to a body of liquid include spraying, point source introduction of high concentration of chemical solutions, or the introduction of soluble chemical powders into the liquid. None of these methods can provide a widespread surface application of sufficiently consistent concentration. Furthermore, because the entire volume of water, and not just the upper layer, is treated with chemicals, these methods may have undesirable effects on flora and fauna.

Point source introduction of solutions provides a narrow range treatment with localized concentrations at the points of introduction and low concentrations in between. Spraying provides a broader range of application but the duration of such treatment is limited and frequent reapplication is necessary for sustained effectiveness. Similarly, the introduction of powder is unsatisfactory since the concentrations obtained are somewhat inconsistent and certain powders tend to sink before they are fully dissolved. Consistent treatment of the upper layers of the liquid is therefore difficult.

The search has continued for improved processes and compositions for treating the upper layers of a body of water to effect a chemical change. This invention was made as a result of that search.

OBJECTS AND SUMMARY OF THE INVENTION

Accordingly, it is a general object of the present invention to avoid or substantially alleviate the above discussed problems of the prior art.

A more specific object of the present invention is to provide a method for treating contained bodies of liquid.

Another object of the present invention is to provide a method for treating the upper layer of a body of water such that there results a prolonged treatment of the water without frequent reapplication of the treating agent.

A further object of the present invention is to provide a composition for use in that method.

Still another object is to provide a composition useful in the clean-up of oil spills.

Other objects and advantages of the present invention will become apparent from the following summary of the invention and description of its preferred embodiments.

The present invention provides, in one aspect, a method for treating the upper layer of a body of water to effect a chemical and/or physical change within this upper layer. This method comprises placing a composition comprising an expanded silicate aggregate which is impregnated with at least one treating agent onto the surface of the body of water and allowing the composition to float upon the surface of the body for sufficient time to effect the change.

In another aspect, the present invention provides a composition useful for treating the upper layer of a body of water to effect a chemical and/or physical change within this upper layer. This composition comprises a mixture of an expanded silicate aggregate and an effective amount of at least one treating agent which, when applied for the appropriate time period, is useful for treating the upper layer of a body of water to effect the desired chemical and/or physical change.

DETAILED DESCRIPTION OF THE PREFERRED EMBODIMENTS

The present invention employs the use of an "expanded silicate aggregate". This expanded silicate aggregate and methods for its production are known to those skilled in this art as disclosed in U.S. Pat. Nos. 4,203,773; 3,765,919; and 3,719,510. These aggregates are prepared by expanding hydrated silicates, which have various insolubilizers added to overcome the water solubility. Such insolubilizers include, preferably, boron and boron compounds.

The chemical composition of these aggregates may be adjusted within limits so that appropriate solubility may be achieved. The term "expanded silicate aggregate" in this specification and claims is meant to include inorganic silicate materials with or without various amounts of added insolubilizers.

The production of expanded silicate aggregates by thermal expansion is well known. U.S. Pat. No. 3,765,919 discloses a process of producing a silicate material capable of being expanded at a construction site, or as part of the manufacturing process, by the application of heat. This is achieved in an "expander-dryer" in the form of a rotary calciner in which heated air at elevated temperatures, between 880° F. and 1,020° F. is utilized. A pre-expansion can be achieved in an "oven-dryer" at temperatures of 350° F. to 400° F. U.S. Pat. No. 3,719,510 discloses a process of preparing an expanded insoluble silicate aggregate in which a silicate composition is ground, after mixing and curing, to a particulate form and subsequently expanded by exposure to temperatures of 800° F. to 1,800° F. to obtain rapid and complete expansion.

U.S. Pat. No. 4,203,773 states that the processes described in U.S. Pat. Nos. 3,719,510 and 3,765,919 involve several steps which are difficult to control and discloses an alleged improved method for preparing water insoluble expanded silicate aggregates in which particles are thermally expanded by rapid heating to at least 425° C., generally from 425° C. to 750° C.

U.S. Pat. No. 2,553,759 discloses a method for making porous refractory bodies by coating combustible globules with finely divided refractory material, drying the same on a vibrating table by the use of suitable heating means such as infrared lamps and then firing the dried globules under oxidizing conditions at a temperature sufficient to burn out the combustible material from the interior and cause the desired sintering.

U.S. Pat. No. 3,743,601 discloses a process for forming microcellular, inorganic silicate, foams by expanding hydrated particulate silicates with thermal energy supplied by a source of conventional heat, microwave energy, dissipation of mechanical energy and/or an exothermic reagent to provide part or all of the heat input. Alternatively, the hydrated mass may be uniformly heated under sufficient pressure to prevent loss by evaporation of the water of hydration which, upon rapid release of the pressure, will act as a blowing agent and expand the mass. When microwave energy is utilized, it is applied at a frequency of 2450 megacycles.

U.S. Pat. No. 3,756,839 also discloses the production of alkali metal silicate foam involving the rapid input of heat energy which may be supplied by commercially available heating means such as a radiant heat oven, a convection oven or, in particular, a microwave oven. In a conventional convection or radiant heat oven the material is heated to 500° C. for one hour.

U.S. Pat. No. 3,830,892 discloses a method for manufacturing a molded article of expanded vermiculite which comprises subjecting vermiculite to heating or radiation with electromagnetic waves in the presence of urea or thiourea and, during or after the process, allowing the vermiculite to contact an aqueous solution of ammonium or alkali silicate. Vermiculite is generally expanded at temperatures beyond a critical level of 800° C. The treated vermiculite is expanded, according to the disclosed process, by heating at a temperature of from 160° C. to 500° C., desirably about 220° C., for about 10 minutes to one hour or by radiating the vermiculite with electromagnetic waves. The electromagnetic waves employed are usually microwave or far infrared radiation in which instance the duration of radiation ranges from fractions of a second to thirty minutes. The electromagnetic waves may be supplied by any known sources such as an electronic range or high frequency welder.

A particularly efficacious method of producing expanded silicate aggregates is set forth in Ser. No. 298,589, filed Sept. 2, 1981 and entitled "Process for Thermally Expanding Silicate-Based Material By An Infrared Heat Source" by Hugh A. Ghiringhelli. This process comprises subjecting thermally expandable silicate-based composition particles to infrared radiation. The disclosure of this patent application is hereby incorporated by reference.

In the present invention the expanded silicate aggregate has a density of generally from about 1.5 to about 30, typically from about 1.6 to about 15, and preferably from about 1.7 to about 5 pounds per cubic foot.

Treating agents, such as acids, for example, hydrochloric acid, bases, for example, sodium hydroxide, algicides, for example, cupric sulfate, selective wetting agents, for example, a silicone based water repellant and/or pine oil, bactericides, fungicides, such as ZENEB fungicide, and an herbicide, such as paraquat may be incorporated within the expanded silicate aggregate in order to effect a chemical and/or physical change within the upper layer of the water which is treated with the aggregate.

The amount and kind of treating agent may vary widely depending upon the end use of the composition. For example, if the purpose of the treating agent is to change the pH of the upper layer of water from about 4 to about 6, then the treating agent may be sodium hydroxide and the amount of this treating agent would be from about 20 to about 95% by weight of the total composition.

While the amount of treating agent may vary widely, the present invention employs generally from about 20 to about 95, typically from about 45 to about 80, and preferably from about 55 to about 65% by weight of treating agent based upon the weight of the total composition. Mixtures of two or more treating agents may also be used.

If a treating agent is employed, the expanded silicate aggregate is preferably impregnated with the treating agent. This impregnation may be accomplished by any means known to those skilled in this art such as, for example, spraying the treating agent on the expanded silicate aggregate, or immersion of the expanded silicate aggregate into the solution of the treating agent. If the treating agent is a solid, it may, if sufficiently soluble, be dissolved in water or other solvent and used as discussed hereinabove. Alternatively, an admixture, preferably a substantially uniform admixture, of the silicate aggregate and the solid treating agent may be used.

The rate of release of the treating agent from the expanded silicate aggregate may be controlled by appropriate choice of treating agent depending upon the relative polarities of the treating agent and the water to be treated. In general, the greater the polarity of the treating agent, the more rapid its release from the expanded silicate aggregate into the water to be treated.

The density of the final composition should be such that the composition remains approximately at the surface of the water to be treated. The density of this final composition is generally less than about 1.0, typically from about 0.2 to about 0.9, and preferably from about 0.5 to about 0.8, grams per cubic centimeter.

The particle size of the composition may vary widely and is dependent upon the method of preparation of the composition. When it is desired that the composition of the present invention be physically removed from the water, for example, when the composition is used for absorbing oil, it is preferred to use rather large size particles which contain relatively more air, and are therefore less dense, than small particles. The greater amount of air tends to keep these particles buoyant for a longer period of time as well as absorb a greater amount of oil than smaller sized particles. When it is not desired to physically remove the composition from the water, smaller sized particles may be used. Because of the greater surface area available for wetting with these smaller particles, they become more readily water logged and eventually sink to the bottom of the body of water. The particular size of the particles of expanded silicate may be chosen with these end use considerations in mind.

The composition of the present invention may be used by placing it onto the upper surface of a body of water and allowing it to float upon the surface of that body for sufficient time to effect the desired chemical and/or physical change. This method may be carried out at any temperature and pressure although substantially ambient temperature and pressure are preferred.

The composition of the present invention may be placed upon the surface of the water to be treated in any manner known to those skilled in this art, such as by blowing, dumping, or spraying. The use of a blower is a preferred method of placing this composition since the use of the apparatus tends to evenly distribute the composition or aggregate.

If desired, the expanded silicate aggregate or composition may be removed from the treated water by any means known to those skilled in this art after the desired chemical and/or physical change has been effected. This removal procedure is particularly important when environmental or other considerations require that any residual aggregate be removed from the water substantially immediately after the change has been effected.

The present invention is particularly adapted to the removal of spilled oil by absorbtion of the oil into the expanded silicate aggregate.

Removal of the oil/silicate mixture may be accomplished, for example, by means of a vacuum or power scoop. Other Applications of the present invention in which a foreign substance is not being removed from water do not require removal of the expanded silicate aggregate. The aggregate may be allowed to dissolve and sink.

The growth of water weeds is facilitated by the presence of large concentrations of phosphates in a body of water. The use of the composition of the present invention with a herbicidal treating agent not only tends to kill the water weeds but inhibits further growth since the addition of silicate is believed to reduce the phosphate concentration.

The present invention is further illustrated by the following examples. All parts and percentages in the example as well as in the specification and claims are by weight unless otherwise specified.

EXAMPLE 1

A composition comprising one pound of HAZORB (Diamond Shamrock) expanded silicate aggregate particles having a particle size of 1000 microns and a density of 2.2 pounds per cubic foot and 10 grams of Dow Corning water repellent #772 silicon-based selective wetting agent, are admixed by spraying the wetting agent onto the HAZORB particles with simultaneous agitation of the HAZORB particles. This mixture is spread upon the upper surface of a large volume of water which contains oil spilled on the surface. After 10 minutes, the composition is removed from the water and oil and aggregate is removed.

The water repellant prevents the aggregate from absorbing water but allows the absorption of into the aggregate oil. Pine oil or other selective wetting agents may also be employed.

EXAMPLE 2

An algicidal composition useful in the above method is prepared by mixing from about 0.001 to about 0.1 gallons of chelated copper such as CUTRINE chelated copper with one pound of HAZORB expanded silicate aggregate having a density of about 2.2 pounds per cubic foot. This composition is useful in removing "coats" of algae from the surface of ponds. Other algicidal compounds in varying concentrations may also be used.

EXAMPLE 3

An alkaline neutralizing composition is prepared by mixing from about 0.1 to about 1.7 gallons of from about 1 to about 10 Molar hydrochloric acid per pound of expanded silicate aggregate particles having a density of about 2.2 pounds per cubic foot. This composition is useful to neutralize an alkaline pond. The exact concentration of acid used depends upon the alkalinity of the pond and the desired pH change one wishes to effect. Other acids or mixtures of acids in varying concentrations may also be used

EXAMPLE 4

An acid-neutralizing composition for use in the above method is prepared by mixing from about 0.1 to about 1.9 gallons of from about 1 to about 10 Molar sodium hydroxide per pound of expanded silicate aggregate particles having a density of about 2.2 pounds per cubic foot. This composition is useful to neutralize an acidic pond. The exact concentration of base used depends upon the acidity of the pond and the desired pH change one wishes to effect. Other bases or mixtures of bases in varying concentrations may also be used.

EXAMPLE 5

A composition useful for killing fungi is prepared by mixing from about 0.1 to about 1.0 gallons of ZENEB fungicide with about one pound of expanded silicate aggregate having density of about 2.2 pounds per cubic foot and a particle size of 200 mesh. This composition is placed on the surface of a body of water and floats in the water for about one day performing its desired fungicidal activities.

EXAMPLE 6

An herbicidal composition is prepared by mixing from about 0.001 to about 0.1 gallons of paraquot with about one pound of expanded silicate aggregate having a density of about 2.2 pounds per cubic foot. This composition is useful to control herbaceous plant growth in a pond. Other herbicides or mixtures thereof in varying concentrations may be used.

EXAMPLE 7

A bactericidal composition is prepared by mixing from about 0.001 to about 0.1 gallons of a bactericide with about one pound of expanded silicate aggregate having a density of about 2.2 pounds per cubic foot. The composition is applied as in Example 5. Any bactericide or mixture of bactericides in varying concentrations may be used.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

We claim:

1. A method for treating the upper layer of a body of water to effect a chemical and/or physical change within said upper layer, comprising placing a composition comprising an expanded silicate aggregate which is impregnated with up to about 95% by weight of the total composition of at least one water treating agent which when contracted with water said water treating agent will be released into the water to be treated, onto the surface of said body, and allowing said composition to float upon said surface for sufficient time to effect said change.

2. The method of claim 1 wherein said expanded silicate aggregate is a sodium silicate.

3. The method of claim 1 wherein said treating agent is a bactericide.

4. The method of claim 1 wherein said expanded silicate aggregate has a density of from about 1.7 to about 5 pounds per cubic foot.

5. The method of claim 1 wherein said treating agent is an acid.

6. The method of claim 1 wherein said treating agent is a base.

7. The method of claim 1 wherein said treating agent is an herbicide.

8. The method of claim 1 wherein said treating agent is an algicide.

9. A method for treating the upper layer of a body of water to effect a chemical change within said upper layer, comprising placing a composition comprising an expanded silicate aggregate which is impregnated with up to about 95% by weight of the total composition of at least one chemical water treating agent onto the surface of said body, and allowing said composition to float upon said surface releasing said water treating agent until said water treating agent has diffused into said layer of water and affected said change by chemical reaction.

* * * * *